United States Patent [19]

Mitchell

[11] Patent Number: 5,542,795
[45] Date of Patent: Aug. 6, 1996

[54] PLUNGE AND FACE MILLING CUTTER WITH UNIVERSAL INSERT SEATS

[75] Inventor: Robert N. Mitchell, Raleigh, N.C.

[73] Assignee: Kennametal Inc., Latrobe, Pa.

[21] Appl. No.: 380,480

[22] Filed: Jan. 30, 1995

[51] Int. Cl.$^6$ .................................................. B23C 5/08
[52] U.S. Cl. ............................................ 407/35; 407/42
[58] Field of Search .............................. 407/35, 42, 47, 407/53, 99, 113

[56] References Cited

U.S. PATENT DOCUMENTS

| | | | |
|---|---|---|---|
| 1,629,667 | 5/1927 | Knipple . | |
| 2,688,179 | 9/1954 | Greenleaf . | |
| 3,629,919 | 12/1971 | Trevarrow, Jr. . | |
| 3,662,444 | 5/1972 | Erkfritz . | |
| 3,670,380 | 6/1972 | Moore et al. . | |
| 3,733,665 | 5/1973 | Spriggs . | |
| 3,831,236 | 8/1974 | Coburn et al. . | |
| 4,218,162 | 8/1980 | Hillier | 408/188 |
| 4,666,349 | 5/1987 | Altmeyer et al. | 407/118 |
| 4,693,641 | 9/1987 | Tsujimura et al. | 407/42 |
| 4,812,087 | 3/1989 | Stashko . | |
| 4,906,145 | 3/1990 | Oliver | 407/43 |
| 4,920,131 | 5/1990 | Allemann | 407/234 |
| 4,946,318 | 8/1990 | David et al. | 407/42 |
| 4,964,762 | 10/1990 | Arai et al. | 407/34 |
| 4,964,763 | 10/1990 | Kieninger | 407/40 |
| 4,966,500 | 10/1990 | Tsujimura et al. | 407/34 |

OTHER PUBLICATIONS

Toshiba Tungaloy Product Catalog of Carbide & Ceramic Tooling Systems, p. 101, Available in Oct., 1990.

Primary Examiner—M. Rachuba
Assistant Examiner—Kenneth J. Hansen
Attorney, Agent, or Firm—John J. Prizzi

[57] ABSTRACT

A milling cutter for performing plunge and face cutting operations on a workpiece with cutting inserts having different shapes is provided that comprises a plurality of cutting inserts having side and transverse cutting edges, the transverse cutting edges being of different shapes for different inserts, a cutter body having a plurality of recessed insert seats for securably receiving the inserts, including a top shoulder spaced apart from the transverse cutting edges of the inserts for allowing the insert seat to receive inserts having transverse edges of different shapes, and a support structure for preventing relative movement between the cutting inserts and their respective seats along the side and transverse insert edges. In the preferred embodiment, the support structure includes a rail-like projection extending out of the back face of the cutting inserts that is substantially parallel to the side cutting edges of the insert, and a complementarily-shaped slot in the bottom wall of the seat, in combination with a shoulder formed in the insert seat near but spaced apart from the top shoulder of the seat, and a complementary recess in the insert substantially parallel to its transverse cutting edges.

18 Claims, 7 Drawing Sheets

PLUNGE AND FACE MILLING CUTTER WITH UNIVERSAL INSERT SEATS

FIELD OF THE INVENTION

This invention generally relates to a milling cutter capable of plunge, ramp, and face milling operations for rapidly removing large amounts of materials from a workpiece, and is specifically concerned with such a cutter having seats capable of receiving and securing inserts having differently dimensioned and differently shaped upper and lower cutting edges.

BACKGROUND OF THE INVENTION

Milling cutters for machining structural components are well known in the prior art. However, such structural components as those used, for example, in aircraft are usually thin in cross-section and have deep pockets. Such parts are generally machined from a large, solid block of a strong, lightweight metal such as titanium. Often, more material is removed from the block of metal than remains in the finished workpiece. The most common method for machining such structural components is to use a drill in combination with a milling cutter. The drill is used to form access holes of a predetermined depth equal to the depth of the pocket to be formed. The milling cutter is then lowered into the access hole and moved back and forth over the workpiece in the same plane until the entire cross-sectional area of the pocket being formed has been traversed. The cutter is then lowered further into the access hole and the process is repeated as many times as necessary to form a pocket of the desired depth. Such a prior art technique is, of course, very time consuming. Two separate machining operations are required for every pocket (i.e., drilling and milling). Since the depth of cut which conventional milling cutters are capable of making is usually small in relation to the depth of the pocket being formed, many passes over the workpiece are required to achieve the desired pocket depth.

While there are milling cutters capable of performing both plunge and face milling operations, such cutters are not without their limitations. For example, when the same milling cutter is used to perform both plunge and face milling operations, the cutting inserts mounted in the cutter head are simultaneously subjected to large axial, radial and tangential forces. In order to prevent the inserts in the cutter head from axial, radial, or tangential movement during the cutting operation, the seats in such prior art cutters are complementary in shape to the inserts that they receive so that their upper and side edges securely engage and mate with the transverse edge and side edge of the inserts, respectively. Such an arrangement, however, allows the milling head to accommodate only one particular shape of cutting inserts. Hence, a different milling cutter must be used whenever a differently shaped cut is desired, such as when corners of a smaller or larger radius between the sidewalls and floor of the cut are required.

Clearly, what is needed is a milling cutter capable of effectively cutting deep pockets in a workpiece in both the vertical and transverse direction in order to obviate the need for separate drilling and milling operations in the workpiece. Ideally, the same cutter head would be able to accommodate inserts having different shapes so that the same milling cutter could be used to make differently shaped cuts in the workpiece, such as differently-radiused corners between the sidewalls and the floor of the cut. The insert seats should be designed for positively securing the inserts against axial, radial, or tangential movement during the cutting operation, which could create an unsatisfactorily rough cut and cause undue wear on the cutting edges of the inserts. The milling cutter and inserts should be designed so that the cutter is capable of making a deep vertical cut in relation to its size. Additionally, a positive rake angle should be maintained on the cutting edges for both vertical and lateral cutting of the workpiece both to reduce the power necessary to machine the workpiece, and to maximize the life of the cutting edges of the inserts.

SUMMARY OF THE INVENTION

Generally speaking, the invention is a milling cutter for cutting a workpiece with cutting inserts having a variety of different shapes that overcomes or at least ameliorates all the aforementioned shortcomings associated with the prior art. The milling cutter comprises a plurality of cutting inserts, the transverse edges being of different shapes for different inserts, and an annular cutter body having a plurality of recessed insert seats for securably receiving the inserts. The insert seats each include a side shoulder for securably engaging one of the side edges of the inserts, and a top shoulder that is spaced apart from the transverse edges of all of the inserts for allowing the insert seats to receive inserts having transverse edges of different shapes. The cutter further comprises a support means for preventing relative movement between the cutting inserts and the seats along the side and transverse insert edges and the side and top shoulders of the recess. The support means includes a projecting element formed on either the back face of the cutting insert or the bottom wall of the insert seat, and a recess formed on the other of the back face or bottom wall for receiving the projecting element. The inserts may be secured in their respective seats by means of screws.

The side edges of each of the inserts are preferably straight in order to impart a smooth finish to a sidewall of a workpiece. Additionally, the side edges of each insert are preferably parallel so that the inserts cut smooth sidewalls along both the inner and the outer diameters of the annular cutter body. Each of the inserts is preferably elongated along its side edges in order to increase the depth of the cut made in a workpiece by the transverse edges of the inserts. Each of the side and transverse cutting edges may be formed by an acute angle between the front face and side surfaces of the inserts to impart a positive radial rake angle to the cutting edges.

The support means of the cutter and insert may include an elongated, rail-like projecting element and a complementarily-shaped recess, both of which may be substantially parallel to the insert side edges and recess side shoulder for preventing transverse relative movement between the insert and the cutter body. The projecting element is preferably formed on the back face of the cutting insert, while the recess is formed on the bottom wall of the seat for two reasons. First, it is easier to fabricate a projection, rather than a recess on the back face of the insert. Secondly, such a projection (unlike a recess) will not structurally weaken the insert. The support means preferably also includes a second elongated projection and complementary recess that is oriented substantially parallel to the insert transverse edges and the recess top shoulder for preventing relative movement along the sides of the insert and the cutter body. The first and second elongated projections and their complementary recesses may traverse one another, and are preferably orthogonally disposed with respect to each other.

A screw that secures each of the inserts includes a head and a threaded shank, and each of the inserts includes a bore for receiving the shank and a counter-bore for receiving the screw head. Preferably, the counter-bore of each of the inserts forms a pilot surface that engages the screw head in a manner than securely seats the second projection of the support means against the surface of the second complementary recess.

The space between the top shoulder of the insert recesses and the transverse edges of the inserts allows the insert seats to receive and secure inserts having virtually any shape of transverse edge. Hence the same milling head can make cuts having corners of different radii, if desired. Moreover, the pressure applied by the pilot surface of the screw, in combination with the complementary interfitting between the first and second transversely disposed projections and recesses, both secures and supports the inserts against movement and their respective insert seats in any direction.

DETAILED DESCRIPTION OF THE SEVERAL FIGURES

Figure 1:
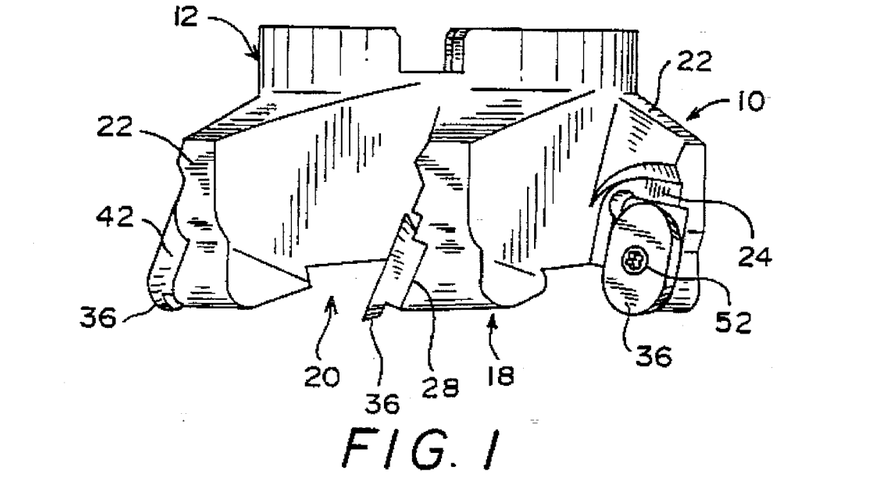
FIG. 1 is a side view of the plunge and face milling cutter of the present invention.
Figure 2:
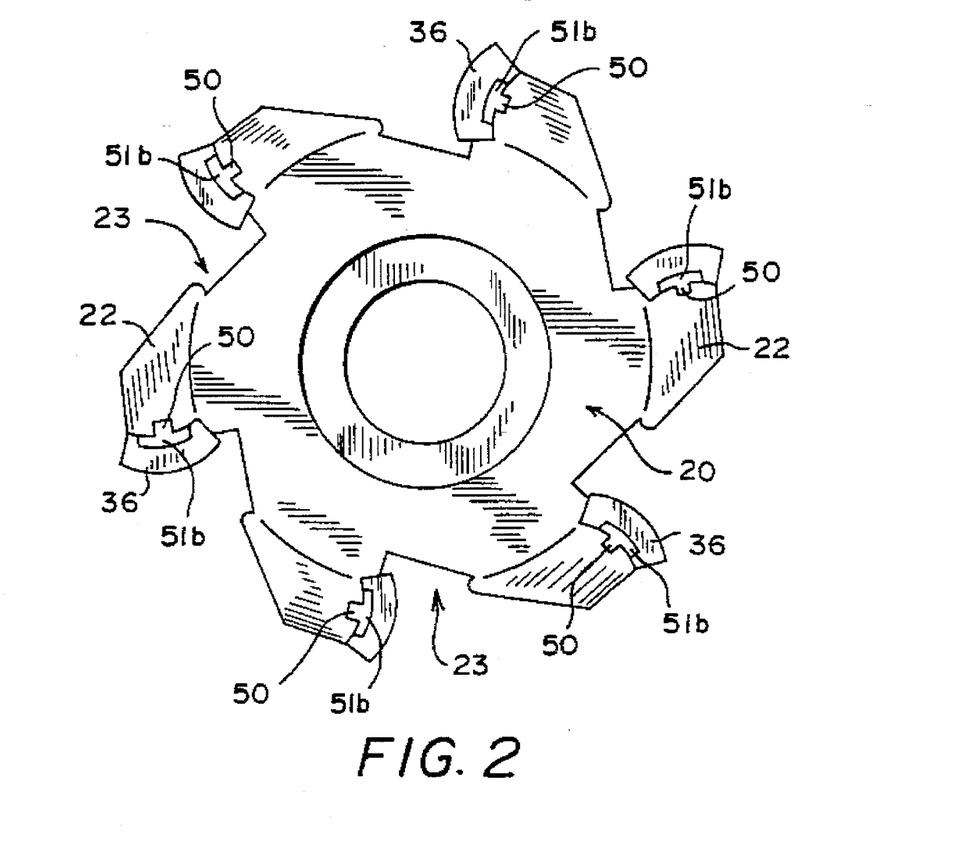
FIG. 2 is a top view of the milling cutter of FIG. 1.
Figure 3:
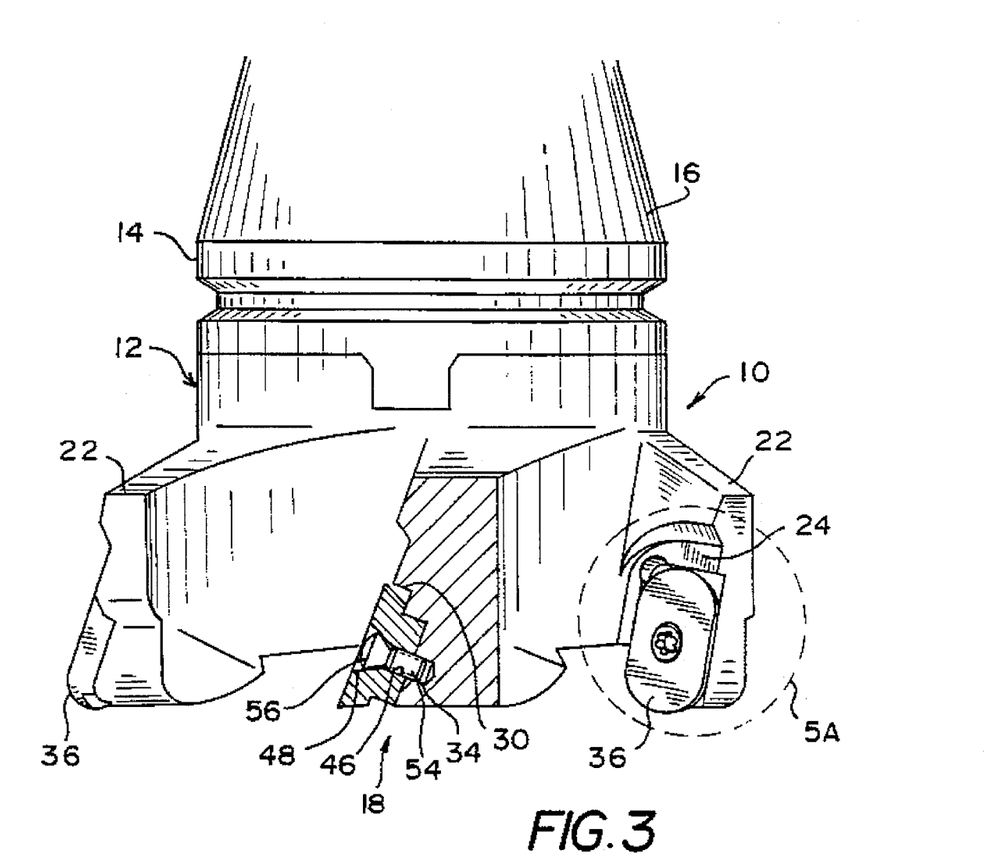
FIG. 3 is a side view of the milling cutter with a mounting lug portion shown in section.

Referring now to FIGS. 1, 2, and 3, a plunge and face milling cutter according to the present invention is shown therein and indicated generally by the numeral 10. The milling cutter comprises a cutter body 12 which is mounted on an adapter 14 (shown in FIG. 3). The adapter 14 has a tapered shank 16 which may be inserted into the spindle of a milling machine (not shown). The cutter body 12 is generally cylindrical in shape and includes a forward end 18 formed with a central cavity 20. In the embodiment shown, six tool mounting lugs 22 are formed on the outer periphery of the cutter body 12. The tool mounting lugs 22 are equally spaced about the axis of the cutter body 12. As best seen in FIG. 2, chip gullets 23 are provided between the tool mounting lugs 22 to facilitate the expulsion of metal chips during a cutting operation. Each tool mounting lug 22 includes a tool mounting region 24 which faces in the direction of rotation of the cutter body 12.

Figure 4:
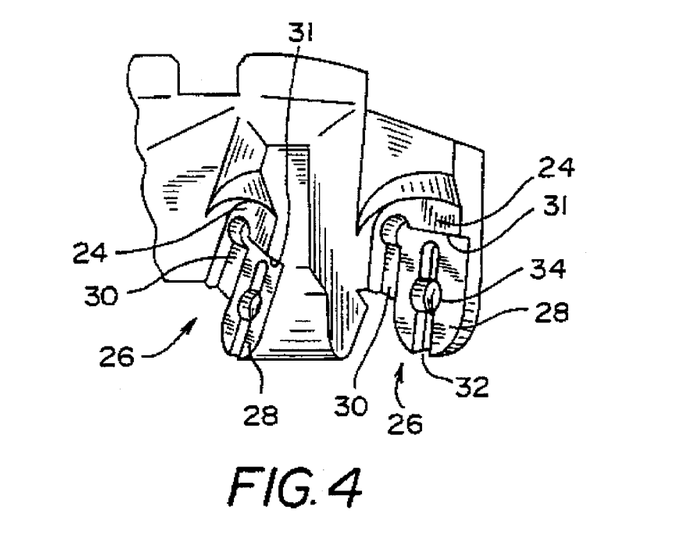
FIG. 4 is a partial side view of the milling cutter of FIG. 1 shown without cutting inserts to show the insert seats.
Figure 5:
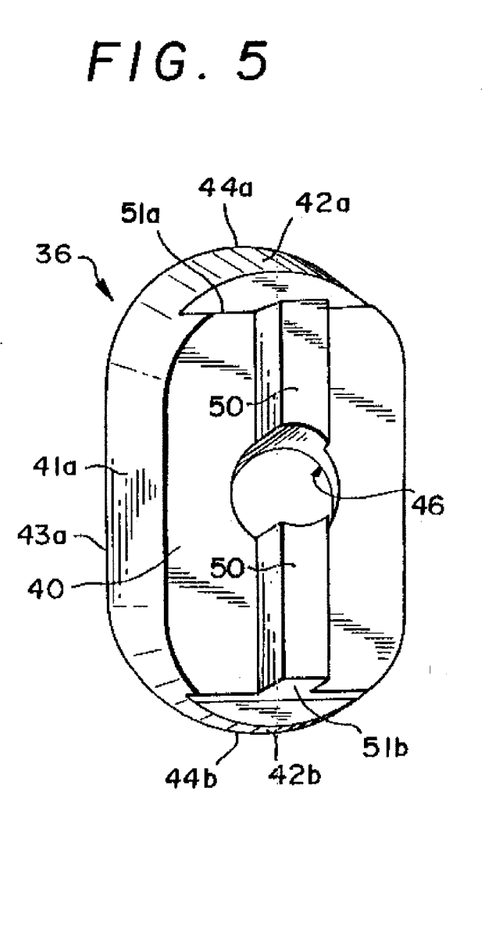
FIG. 5 is a perspective view of both an insert seat and the back face of an insert, illustrating how the inserts fit into their respective seats.

With reference now to FIG. 4, an insert seat 26 for receiving an insert 36 is formed in the tool mounting region 24 of each lug 22. Each insert seat 26 includes a bottom wall 28, a side shoulder 30, and a top shoulder 31 as shown. As is best seen in FIG. 5, the bottom wall 28 of each seat 26 includes a longitudinally oriented slot or recess 32 for receiving a complementary-shaped rail 50 that protrudes from the back surface of each of the inserts 36 and is oriented along a longitudinal axis 50a, as will be described in more detail hereinafter. Each insert seat 26 includes a threaded base 35 for receiving an insert mounting screw. As is best seen in FIGS. 6A, 6B, 7A, and 7B, the top shoulder 31 of each insert seat 26 is spaced apart from the top edge of any insert 36 mounted in the seat 26. Such spacing advantageously allows the insert seat 26 to accommodate inserts 36 having differently shaped end portions. Such spacing further creates a clearance cavity 33 that prevents any portion of the upper edge of the insert 36 from coming into contact with the top shoulder 31 of the seat 26. This is an important structural feature, as such contact during the operation of the milling cutter could cause the upper edge of the insert to chip. The clearance cavity 33 has an enlarged portion 34 to insure that the cavity 33 can accommodate inserts having corners with small radii, such as the insert shown in FIG. 7A.

Figure 6A:
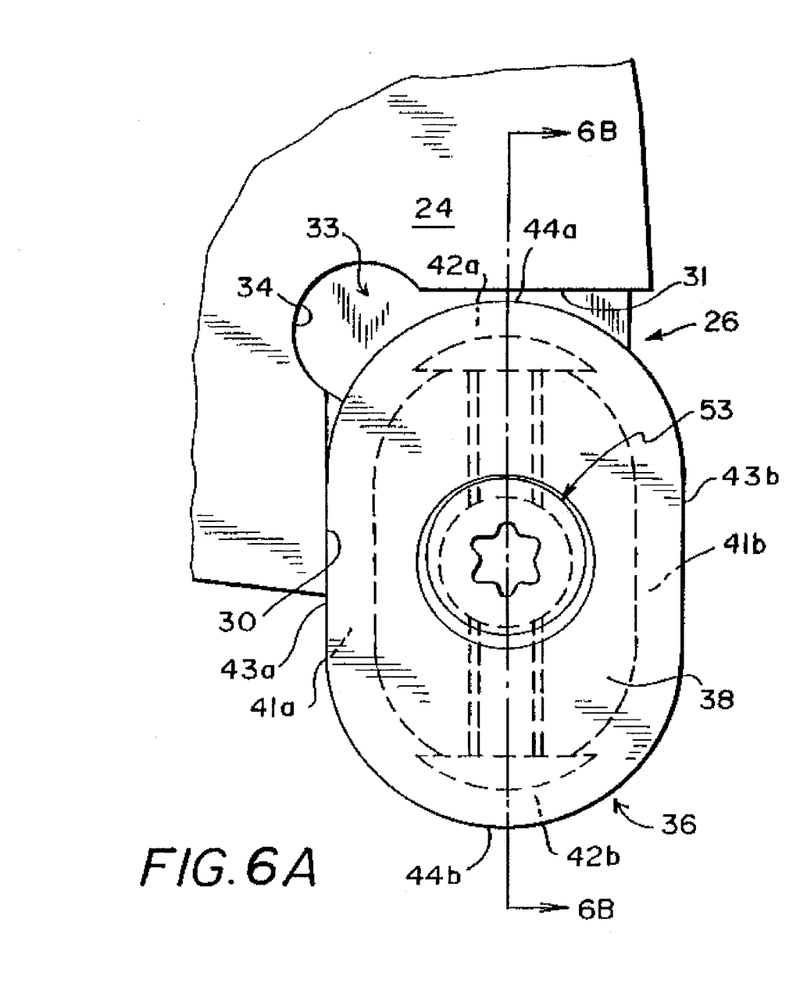
FIG. 6A is an enlarged front view of the portion of the milling cutter circled in FIG. 3.
Figure 6B:
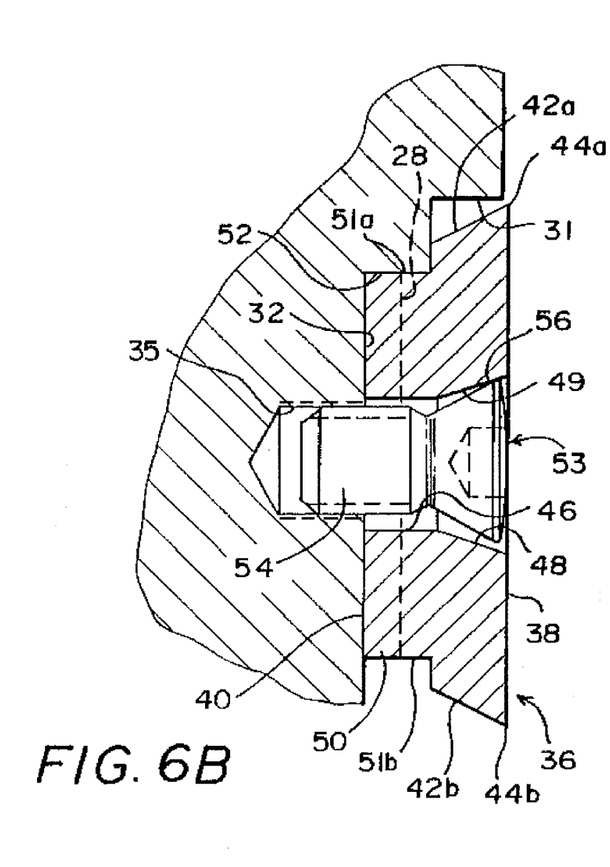
FIG. 6B is a cross-sectional side view of the insert and insert seat shown in FIG. 6A along the line 6B—6B.
Figure 7A:
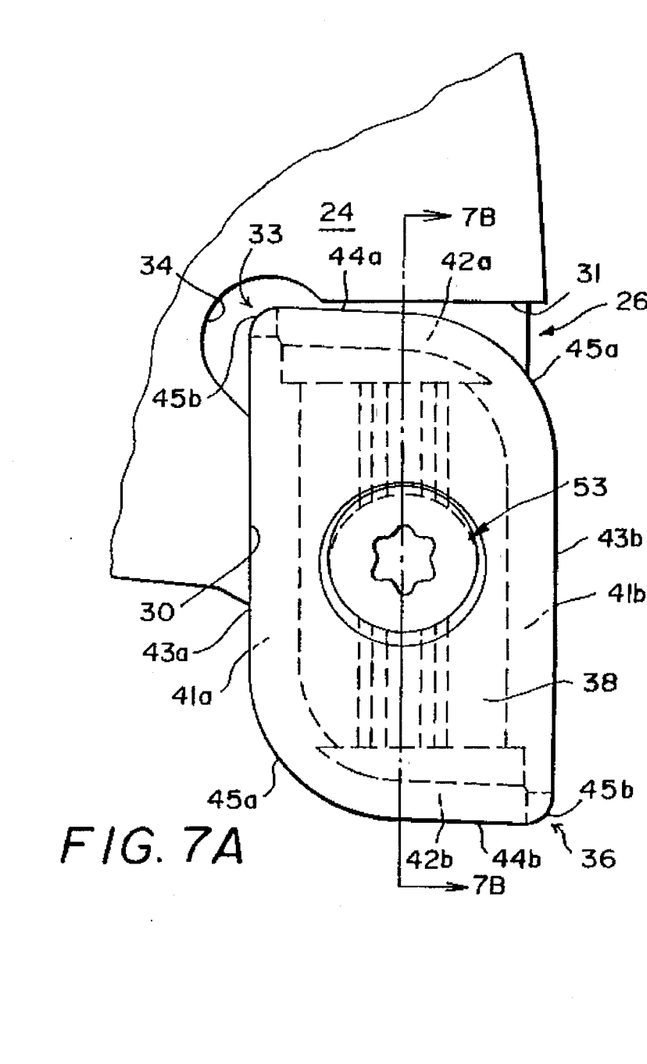
FIG. 7A is an enlarged front view of the portion of the milling cutter circled in FIG. 3 with a differently shaped insert.
Figure 7B:
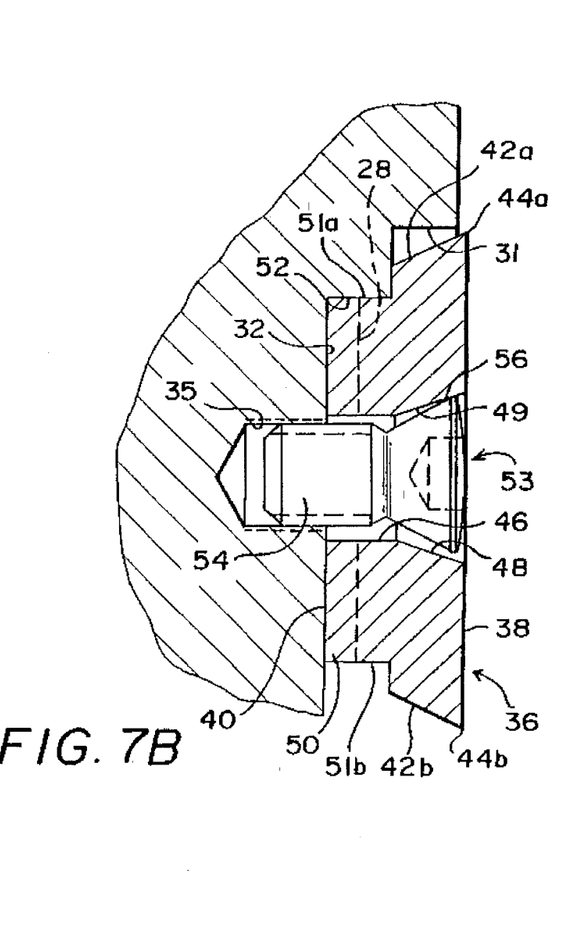
FIG. 7B is a cross-sectional side view of the insert and insert seat shown in FIG. 7A along the line 7B—7B.
Figure 8A:
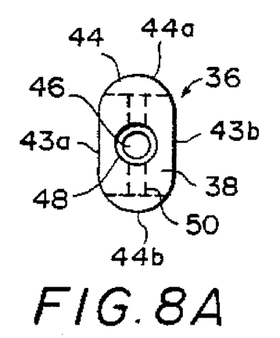
FIG. 8A is a plan view of the cutting insert shown in FIG. 6A.
Figure 8B:
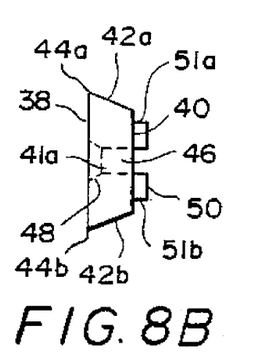
FIG. 8B is a side elevation of the insert shown in FIG. 8A.
Figure 8C:
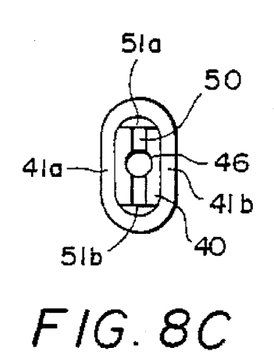
FIG. 8C is a bottom view of the cutting insert shown in FIG. 8A.

With reference now to FIGS. 5 and 6A through 7B, each insert 36 includes front and back parallel faces 38 and 40, respectively; sidewalls 41a, 41b, and upper and lower walls 42a, 42b. The sidewalls 41a, 41b and upper and lower walls 42a, 42b are not orthogonal with respect to the front and back faces 38 and 40, but instead form an acute angle with the front face 38 and an obtuse angle with the back face 40. Sidewalls 41a, 41b form an acute angle with front and back faces 38 and 40 in a manner similar to that of upper and lower walls 42a, 42b with faces 38 and 40, as shown in FIGS. 6B and 7B. Such an oblique geometry creates side cutting edges 43a, 43b and transverse cutting edges 44a, 44b having a positive rake angle where the walls 41a, 41b, 42a, and 42b intersect with the front face 38. Such positive rake angles reduce the amount of vibration generated during a cutting operation, as well as the amount of power necessary to drive the milling cutter. The cutting inserts 36 also have an elongated shape in order to provide a relatively deep cut in proportion to their overall size, and are, of course, indexable.

Figure 9A:
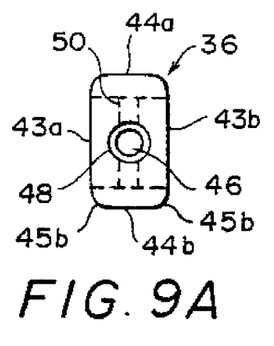
FIG. 9A is a plan view of an alternate cutting insert for use in the milling cutter of FIG. 1.
Figure 9B:
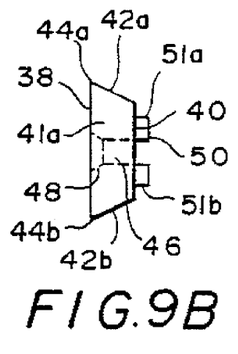
FIG. 9B is a side elevation of the insert shown in FIG. 9A.
Figure 9C:
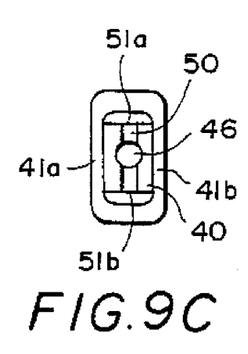
FIG. 9C is a bottom view of the insert shown in FIG. 9A.
Figure 10A:
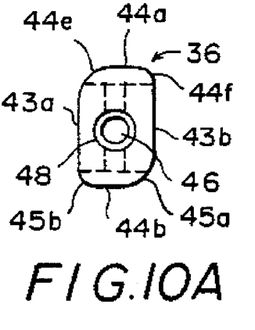
FIG. 10A is a plan view of the insert shown in FIG. 7A.
Figure 10B:
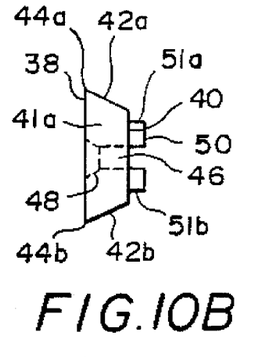
FIG. 10B is a side elevational view of the insert of FIG. 10A.
Figure 10C:
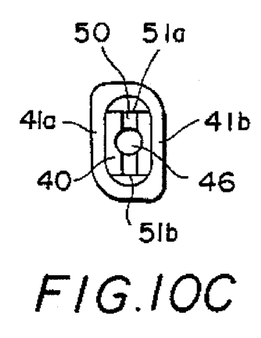
FIG. 10C is a bottom view of the insert of FIG. 10A.

The inserts may have corners of different radii in order to provide cuts having different radii. For example, the insert shown in FIGS. 6A and 6B and 8A through 8C has two broadly curved end portions for the formation of a corner having a large radius between the side and upper and lower cutting edges 43a, 43b and 44a, 44b. FIGS. 9A through 9C show an alternate design for a cutting insert 36. This embodiment of the cutting insert 36 is generally rectangular in shape and includes relatively straight transverse cutting edges 44a and 44b, and straight side cutting edges 43a and 43b. As shown in FIG. 9A, a small radius 45b is formed at each corner where the upper and lower cutting edges 44a and 44b meet the side cutting edges 43a and 43b. A third design for the cutting insert 36 is illustrated in FIGS. 7A, 7B, and 10A through 10C. In this embodiment, the cutting insert 36 is again generally rectangular in form and includes relatively straight upper and lower cutting edges 44a and 44b and straight side cutting edges 43a and 43b. As with the previous embodiment, all four corners are radiused. Unlike the previous embodiment, however, the radii at the four corners are not equal. Instead, two diagonally opposed corners include a large radius indicated at 45a, while the other two diagonally opposed corners include a small radius indicated at 45b.

In all cases, the cutting insert 36 is mounted in the insert seat 26 in such a manner that the straight side cutting edges 43a and 43b are both presented in a radially orthogonal orientation, and one of the transverse cutting edges 44a, 44b is presented in a downward direction, making it possible to smoothly finish both inner and outer sidewall surfaces of a cavity formed in a workpiece, as well as the floor of the cut. The cutting insert 36 is secured in the insert seat by means of a locking screw 53 as best seen in FIGS. 6A through 7B. More particularly, a threaded hole 35 is formed in the bottom wall 28 of the insert seat 26 to threadably engage the shank 54 of the locking screw 53. The shank 54 of the locking screw 53 passes through a clearance hole 46 formed in the center of the cutting insert 36. The clearance hole 46 includes a tapered counter-bore 48 which is engaged by a corresponding tapered surface on the head 56 of the locking screw 53. One side 49 of the counter-bore 48 acts as a pilot surface such that, upon the tightening of the locking screw 53, the engagement of the head 56 of the locking screw 53 against the pilot surface of the tapered counter-bore 48 not only presses the cutting insert 36 downwardly and inwardly against the bottom 28 and the sidewall 30 of the insert seat, respectively, but also properly aligns the insert 36 within the seat 26.

The milling cutter 10 of the present invention is particularly designed for plunge and face type milling operations where the milling cutter is first fed axially into the workpiece to a predetermined depth and then fed alternately in a direction perpendicular to the axis of rotation of the milling cutter 10. When the lateral feeding of the milling cutter begins, the cutting inserts 36 will cut on their radially outward edges during 180 degrees of travel and on their radially inward edges during the next 180 degrees of travel. The cutting forces acting on the inserts 36 tend to push them inwardly or outwardly in the radial direction. Additionally, there is a tendency for the cutting inserts 36 to rotate about the axis of the locking screw 53 which can cause brinelling where the inserts rub against the sidewall 30 of the insert seat 26.

To secure the inserts against these forces, the milling cutter 10 of the present invention provides means for improved lateral and rotational support for the cutting insert 36. Such improved lateral and rotational support is achieved by an integrally formed rail 50 formed on the back face 40 of each cutting insert 36 which is received in a similarly shaped slot 32 formed in the bottom wall 28 of its respective insert seat 26, as is best seen in FIG. 5. The rail 50 extends along the longitudinal axis of each cutting insert 36. Additional support is provided by transverse shoulders 51a, 51b located on the upper and lower ends of the back face 40 of the insert 36. As seen in FIGS. 6B and 7B, one of these shoulders 51a, 51b is received in a complementary-shaped recess 52 located just below the top shoulder 31 of each insert seat 26. Preferably, the shoulders 51a, 51b are orthogonally disposed with respect to the rail 50.

Alternatively, the rail 50 could be formed on the bottom 28 of the insert seat 26 with the slot 32 being formed in the back face 40 of the cutting insert 36. In the embodiment shown, the rail 50 has a generally rectangular cross-section. It will be appreciated, however, that other configurations, such as V-shaped rails, may be used. Similarly, the shoulders 51a, 51b can be replaced with either rails or grooves, as can the recess 52 of the insert seats 26.

Figure 11A:
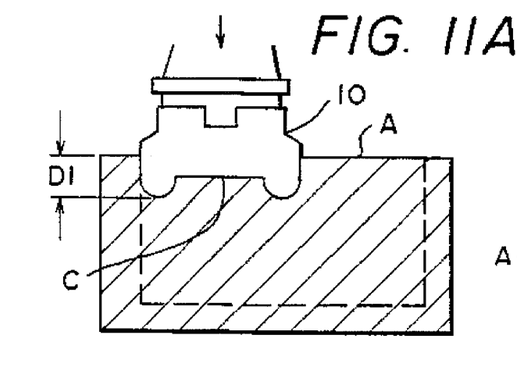
FIGS. 11A through 11D are side sectional views of a workpiece at various stages of milling using the present invention.
Figure 11B:
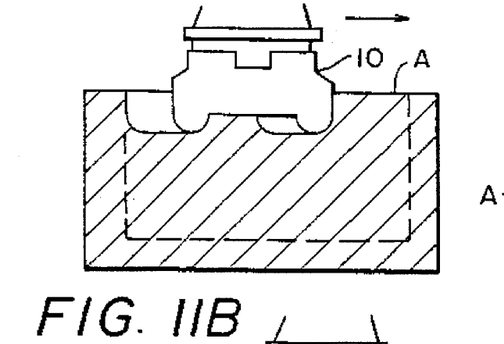
Figure 11C:
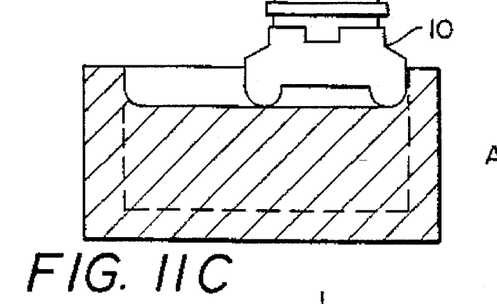
Figure 11D:
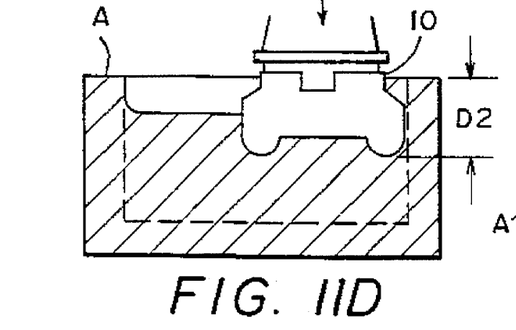
Figure 12A:
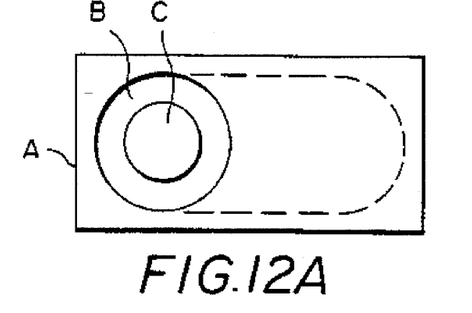
FIGS. 12A through 12D are top plan views of the same workpiece at various stages of the milling using the present invention.
Figure 12B:
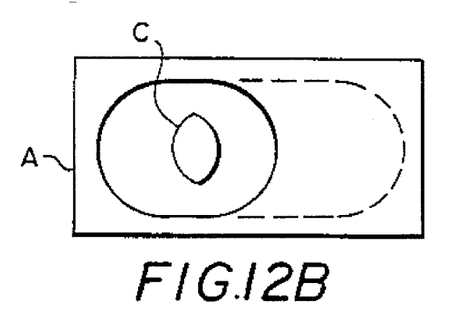
Figure 12C:
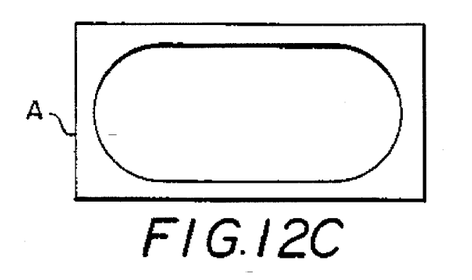
Figure 12D:
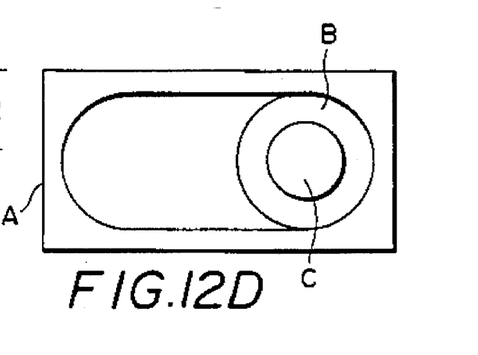

Referring now to FIGS. 11A through 11D and FIGS. 12A through 12D, a method for using the milling cutter 10 of the present invention is illustrated. More particularly, these figures illustrate how the milling cutter 10 of the present invention can be used to mill a cavity (shown in dotted lines) in a workpiece. The milling cutter 10 is first fed axially into the workpiece A to a predetermined depth D1 as shown in FIG. 11A. During axial feeding of the milling cutter 10, an annular groove B is formed in workpiece A as shown in FIG. 12A. A core C of material is left inside the annular groove B. After feeding the milling cutter 10 to the predetermined depth D1, the milling cutter 10 is fed laterally as shown in FIG. 11B. As the milling cutter 10 is moved laterally, the inserts 36 will cut on the radially outward directed edges of the insert 36 for 180 degrees of travel and will cut on the radially inward directed edges of the insert 36 for the next 180 degrees of travel. After traveling laterally a distance equal to the diameter of the milling 10, the entire core C will be removed. The milling cutter 10 will continue to move laterally until a groove of the desired length is made, as shown in FIGS. 11C and 12C. The milling cutter 10 is then fed axially into the workpiece A to a predetermined depth D2 as shown in FIGS. 11D and 12D. The milling cutter 10 is then moved back towards its original starting point in a direction perpendicular to the axis of the milling cutter. The sequence can be repeated as many times as necessary to mill a cavity of any predetermined depth. The cutter 10 can also be moved back and forth in both the x and y dimensions to form a cavity wider than the diameter of the cutter 10. Also, the cutter 10 can be simultaneously moved axially and laterally to form an incline or ramp in the workpiece.

During the axial feeding of the milling cutter 10, there is a potential problem with the formation of long continuous chips. This situation is undesirable since a continuous chip tends to wrap around the spindle of the milling machine. It is far more desirable to break the chip into small segments so that the chips can be carried away by the coolant. In order to break the chip into small segments, the milling cutter 10 is fed intermittently into the workpiece. In other words, the milling cutter 10 is instantaneously paused at a predetermined interval during axial feeding of the cutter into the workpiece. Such intermittent axial feeding may not be required when the chip formed is discontinuous.

Based on the foregoing, it is apparent that the milling cutter 10 of the present invention can be used to rapidly remove material from a large workpiece in a single operation. The milling cutter 10, due to the shape and increased stability of the insert, can make greater depths of cut than conventional milling cutters requiring fewer passes to mill a cavity of a predetermined size and depth. Further, the improved stability of the insert prevents the insert from being dislodged or rotated when cutting on both the inner and outer edge of the insert.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A milling cutter for cutting a workpiece with cutting inserts having different shapes, comprising:

a plurality of cutting inserts, each of which includes front and back faces, at least two opposing side walls that define opposing, substantially linear cutting edges at an intersection between said side walls and said front face, and at least two opposing transverse cutting edges joining said side cutting edges;

a cutter body having a plurality of recessed insert seats for securably receiving said inserts, wherein each seat includes a bottom wall for engaging said back face of one of said inserts, a side shoulder for securably engaging one of said side walls of said inserts, and a top shoulder spaced apart from said transverse cutting edges of said inserts for allowing said insert seat to receive inserts having transverse edges of different shapes, and support means for preventing relative movement between said cutting inserts and said seats along said side and transverse insert cutting edges and said side and top shoulders of said seat, said support means including first and second elongated projecting elements integrally formed on either the back face of the cutting insert or the bottom wall of the insert seat, and first and second recesses formed on the other of said back face or bottom wall for receiving said first and second projecting elements for preventing relative movement along said transverse and side cutting edge of said inserts, respectively, and means for securing said inserts in said seats.

2. The milling cutter of claim 1, wherein said projecting elements and said recesses are complementary in shape to one another, and are generally parallel to said insert transverse and cutting edges for preventing relative movement along said transverse edges.

3. The milling cutter of claim 2, wherein said first and second elongated projecting elements and recesses are mutually perpendicular.

4. The milling cutter of claim 3, wherein said first and second elongated projecting elements and their respective elongated, complementary recesses traverse one another.

5. The milling cutter of claim 3, wherein said securing means includes a locking screw that extends through a counterbore in said insert.

6. The milling cutter of claim 5, wherein said on side of said counter-bore forms a pilot surface that engages said screw in a manner that securely seats said second projecting element into and against a surface of said second recess.

7. The milling cutter of claim 1, wherein each of said inserts includes straight side cutting edges for imparting a smooth finish to a wall of a workpiece.

8. The milling cutter of claim 7, wherein said transverse cutting edges are each of the same shape to render said transverse cutting edges indexable.

9. The milling cutter of claim 1, wherein each of said inserts is elongated for providing depth to a cut in a workpiece made by the transverse cutting edges of said inserts.

10. A plunge and face milling cutter capable of using elongated cutting inserts having different shapes, comprising:

a plurality of elongated cutting inserts, each of which includes back and front faces, two straight side walls parallel to a longitudinal axis of the insert that define opposing side cutting edges at an intersection between said side walls and said front face, and two opposing transverse cutting edges joining said side cutting edges;

a generally annular cutter body having a plurality of recessed insert seats for securably receiving said inserts, wherein each seat includes a bottom wall for engaging said back face of one of said inserts, a side shoulder for securably engaging one of said sidewalls of said inserts, and a top shoulder spaced apart from said transverse cutting edges of said inserts for allowing said insert seat to receive inserts having transverse cutting edges of different shapes, and support means for preventing relative movement between said cutting inserts and said seats along said side and transverse insert cutting edges and said side and top shoulders of said seat, said support means including first and second elongated projecting elements integrally formed on either the back face of the cutting insert or the bottom wall of the insert seat and first and second elongated recesses formed on the other of said back face or bottom wall for receiving the projecting elements for preventing relative movement along said transverse and side cutting edges of said inserts, respectively, and means for securing said inserts in said seats.

11. The plunge and face milling cutter of claim 10, wherein said first elongated, projecting element is a rail and said first recess is a slot complementary in shape to said rail.

12. The plunge and face milling cutter of claim 11, wherein said rail and slot are centrally disposed along the back face of each of said inserts along said longitudinal axis.

13. The plunge and face milling cutter of claim 11, wherein said second projecting element is a shoulder, and the second elongated recess is a recess complementary in shape to said shoulder.

14. The plunge and face milling cutter of claim 13, wherein said rail and first recess are orthogonally disposed with respect to one another and said shoulder and second recess are orthogonally disposed with respect to one another.

15. The plunge and face milling cutter of claim 14, wherein said rail and slot prevent relative movement between said insert and said seat along said transverse edges of said insert, and said recess and shoulder prevent relative movement between said insert and said seat along the longitudinal axis of the insert.

16. The plunge and face milling cutter of claim 15, wherein said securing means includes a screw having a head and a threaded shank, and each of said inserts includes a bore for receiving said shank and a counter-bore for receiving said screw head.

17. The plunge and face milling cutter of claim 16, wherein one side of said counter-bore forms a pilot surface that engages said screw head in a manner that securely seats said shoulder into said recess.

18. A plunge and face milling cutter capable of using cutting inserts having different shapes, comprising:

a plurality of elongated cutting inserts, each of which includes back and front faces, two straight sidewalls parallel to the longitudinal axis of the insert that define opposing cutting edges at an intersection between said sidewalls and said front face, and two opposing transverse walls joining said sidewalls that define opposing transverse cutting edges at an intersection between said transverse walls and said front face, and wherein all cutting edges are defined by acute angles for presenting positive rake angles to a workpiece when mounted in a cutter body;

a generally annular cutter body having a plurality of recessed insert seats for securably receiving said inserts, wherein each seat includes a bottom wall for engaging said back face to one of said inserts, a side shoulder for securably engaging a portion of one of said side walls of said inserts, and a top shoulder spaced apart from said transverse cutting edges of said inserts for allowing said insert seat to receive inserts having transverse cutting edges of different shapes, and wherein each of said seats on said annular cutter body exposes both side cutting edges of said inserts such that said inserts can cut a workpiece both from the outer and inner diameters of said annular cutter body;

support means for preventing relative movement between said cutting inserts and said seats along said side and transverse insert cutting edges and said side and top shoulders of said seat including first and second elongated projecting elements integrally formed on either the back face of the cutting insert or the bottom wall of the insert seat, and first and second elongated recesses formed on the other of said back face or bottom wall for receiving the first and second projecting elements, said first and second elements being at right angles to one another, and a screw extendable through a bore in each insert for securing each of said inserts to its respective seat.

* * * * *